(12) United States Patent
Hvidberg et al.

(10) Patent No.: US 7,318,578 B2
(45) Date of Patent: Jan. 15, 2008

(54) MOTORIZED PULLEY WITH CABLE CONNECTOR

(75) Inventors: Jens Hvidberg, Hvidovre (DK); Jan Stovring Jensen, Rungsted Kyst (DK)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 10/592,659

(22) PCT Filed: Mar. 14, 2005

(86) PCT No.: PCT/EP2005/002713

§ 371 (c)(1),
(2), (4) Date: Nov. 7, 2006

(87) PCT Pub. No.: WO2005/090208

PCT Pub. Date: Sep. 29, 2005

(65) Prior Publication Data

US 2007/0197072 A1    Aug. 23, 2007

(30) Foreign Application Priority Data

Mar. 12, 2004   (DK) ............................. 2004 00405

(51) Int. Cl.
*B66D 1/00* (2006.01)
(52) U.S. Cl. ...................... 254/266; 310/71; 439/733.1; 439/675; 439/873
(58) Field of Classification Search ............... 254/266, 254/362; 310/71, 67 R; 439/733.1, 736, 439/675, 678, 873
See application file for complete search history.

(56) References Cited

U.S. PATENT DOCUMENTS

| | | | |
|---|---|---|---|
| 4,195,272 A | 3/1980 | Boutros | |
| 5,442,248 A | 8/1995 | Agnoff | |
| 5,982,061 A | * 11/1999 | Grantz et al. | ............. 310/67 R |

* cited by examiner

*Primary Examiner*—Emmanuel M Marcelo
(74) *Attorney, Agent, or Firm*—Gerald E. Hespos; Anthony J. Casella

(57) ABSTRACT

The present invention relates to a motorized pulley (1) with a cylindrical cable connector (10) comprising a cylindrical drum (5) that is mounted rotatably about a shaft (11) and is configured for being fixedly mounted on supporting means, said cylindrical drum (5) delimiting an interior space intended for receiving an electric motor (20) for producing a rotating movement of the drum about the shaft (11), and wherein said shaft comprises a cylindrical recess (9) configured at an end of the shaft (11) for receiving the cylindrical cable connector (10) that is electrically coupled to said electric motor (20). Hereby a motorized pulley is accomplished that has a cable connector able to allow for tolerances deriving from the manufacture of the individual parts and mounting tolerances in the motorized pulley with the cable connector.

16 Claims, 4 Drawing Sheets

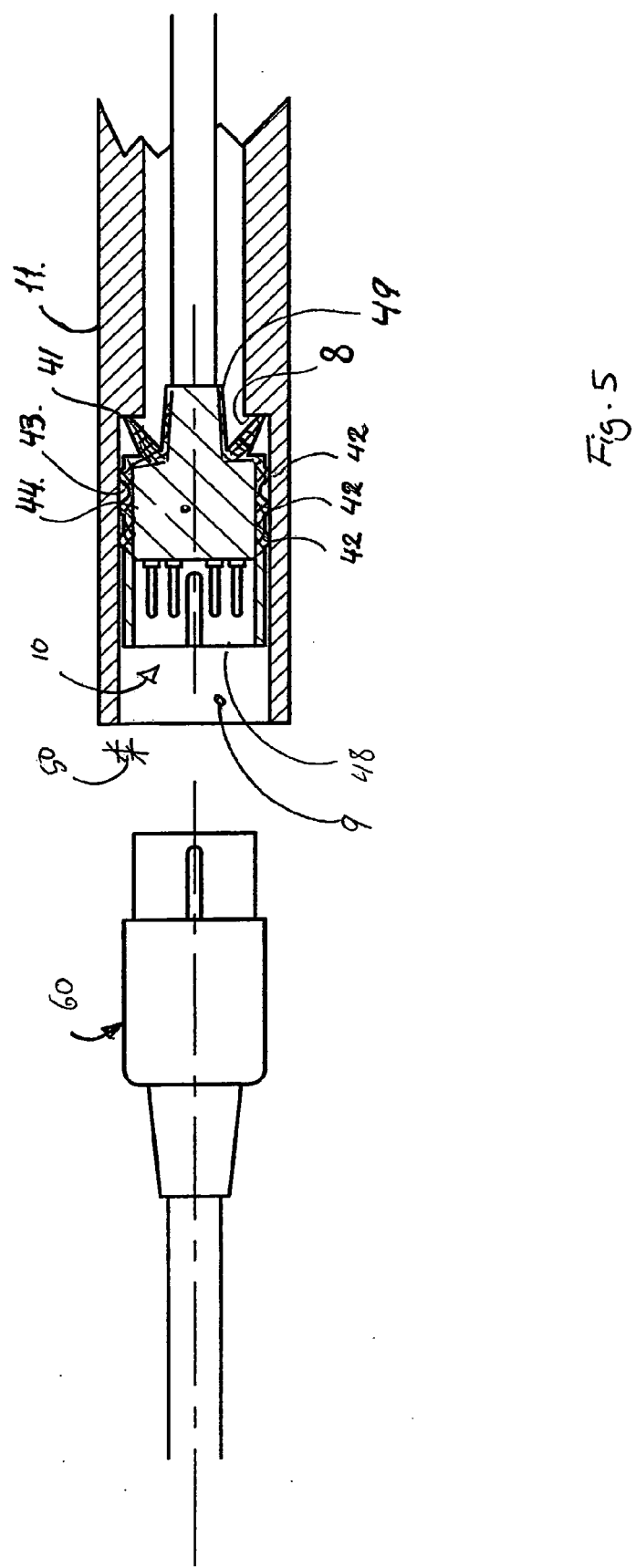

MOTORIZED PULLEY WITH CABLE CONNECTOR

BACKGROUND OF THE INVENTION

1. Field of the Invention

The present invention relates to a motorized pulley with a cable connector.

2. Description of the Related Art

Motorized pulleys are known in a number of contexts and are used ie material handling equipment, including roller conveyors and endless conveyor belts, packaging systems, logistic systems for goods and luggage and check-out counters.

EP 0 752 970 B1 teaches a motorized pulley having an integral electrical connector at the end of the shaft and for being connected to an electric power source. The motorized pulley comprises a cylindrical drum which is rotatably mounted on a stationary roller shaft. An electric motor and a gear are arranged within the drum and are connected to the shaft for producing rotation of the drum about the shaft. At the end of the shaft, a recess is provided for receiving a connector assembly that is electrically coupled to the electric motor. The connector is configured as a cylindrical plug device and has a diameter larger than the diameter of the recess at the end of the shaft, whereby a compression occurs of the connector when it is inserted into the cylindrical recess.

At each end of the shaft a shaft pin is provided exteriorly of the part of the shaft that extends outside the drum and thus covers same. The shaft pin serves to secure the motorized pulley to the support (eg the frame of a conveyor belt) to the effect that reaction forces (the torque) can be transplanted thereto. Each shaft pin is secured to the shaft by means of a screw or pin that is taken through the shaft pin and down into the shaft.

The one shaft pin has a square opening at the one end and is intended for being secured on the shaft end where the cable connector is configured. In this context the square opening serves for insertion of a female connector to the cable connector (the male connector) in order to thereby establish a power supply for the motorized pulley. The female connector is of a particular type that requires very little space for mounting. This is advantageous since, very often, there is not much space available for supporting cable connectors and wiring. The motorized pulley is advantageous in that it enables expedient and simple electric coupling of the motorized pulley. Subsequently the female connector is secured to the shaft cap by means of a screw, whereby a connection is established that will not readily be able to "vibrate" apart. The mounting and exchange, if any, of the motorized pulley can therefore be performed expediently and in a simple manner.

However, in some particular cases problems occur in that large production tolerances occur in the individual parts (cable connector (male connector)/female connector and shaft cap). When the parts are subsequently assembled, ie when the male connector is mounted in the recess in the shaft end and the shaft cap is subsequently mounted thereon, the production tolerances in the individual parts express themselves in that the overall tolerances in the shaft with the mounted cable connector become even quite high. Thereby the problem occurs of conveying the female connector through the opening in the shaft cap and engaging the female connector and the cable connector (the male connector), and finally securing the female connector reliably to the shaft cap by means of the fastening screw. In these particular cases it may involve that the parts must be forced together with ensuing damage to the individual parts, including the cable connector. In other particular cases the tolerances have a magnitude preventing the female connector from being conveyed through the hole in the shaft cap and establishing the conductive coupling with the cable connector, nor can it be secured reliably by means of the fastening screw to the shaft cap.

Of course, this is inconvenient and involves that a number of combinations of cable connectors and female connectors must be tried to find the combination where the tolerances in cable connection and female connection are within acceptable values. In connection with the manufacture of the motorized pulley this combination task can be performed with some difficulty, but in those cases where an already installed motorized pulley is to be exchanged, eg in connection with a renovation task, it will be practically impossible to have to test one's way through various motorized pulleys until the correct combination of cable connector and female connector is found. Alternatively the connector must be forcibly compressed with an ensuing risk of damaging connector and its conductors. It is therefore the object of the invention to provide a motorized pulley with a cable connector whereby the problems associated with the prior art are obviated.

SUMMARY OF THE INVENTION

A motorized pulley is provided that has a cable connector, wherein the cable connector can, despite tolerances in the individual parts (shaft pin, cable connector, shaft bore/recess) and mounting tolerances, be combined with the female connector (the power source) without encountering the problems that exist in connection with the prior art. This is enabled in that, in this context, the continuously annular bead that extends radially from the cylindrical surface of the cable connector provides a "point of rotation" for the cable connector (at the cable end). Thereby the cable connector is able to perform a certain angular rotation about this "point of rotation", whereby the coupling end of the cable connector is able to perform a certain movement within the recess in the space between the inner wall of the recess and cable connector. The annular bead being manufactured from an elastic material, the cable connector can also be displaced laterally in the recess. Thereby the cable connector can attempt to adapt to the female connector when the latter is joined with the cable connector. It has furthermore been found that the continuously annular bead provides a sealing connection between the cable connector and the surface of the recess in the shaft.

According to a preferred embodiment of the invention the cable connector has a coupling end and a cable end, and comprising at said cable end a jacket of a resilient elastic material, said jacket enclosing the cable connector at the cable end and extending towards the coupling end. Hereby an embodiment of the cable connector is accomplished that is advantageous in particular cases, eg when particular production-technical conditions apply.

Preferably said continuously annular bead is configured in the resiliently elastic jacket. Thereby it is accomplished that the annular bead is particularly suitable for adapting to any tolerances prevailing in the cable connector.

Preferably the continuously annular bead is moulded integrally in the resilient elastic jacket. Thereby a particularly advantageous way is accomplished of manufacturing the continuously annular bead simultaneously with the resiliently elastic jacket.

Preferably the jacket comprises an annular lip sealing that extends from the cable end in a direction away from the cable end. Thereby an advantageous sealing is provided between the cable connector and the opening for conveying the electric cable at the end of the recess in the shaft.

The continuous annular beads can advantageously have a diameter larger than the cylindrical recess configured at an end of the shaft, whereby the continuous annular beads are compressed upon insertion of the cable connector in the recess at the end of the shaft. Hereby a particularly advantageous manner of securing the cable connector in the recess is accomplished in that a certain friction hereby occurs between the continuous annular beads and the recess that contributes to securing the cable connector in place in the recess.

According to a further preferred embodiment of the invention the cable connector is a male connector with the conductors situated in a recess at the end of the shaft. The cable connector being configured in the recess in the shaft, a way is accomplished in which to protect the cable connector, which way is advantageous in particular circumstances, the conductors being protected in the recess.

BRIEF DESCRIPTION OF THE DRAWINGS

The invention will now be explained in detail with reference to the drawing, wherein

FIG. 5 is a sectional view of a shaft end with a cable connector according to the invention.

DETAILED DESCRIPTION OF THE PREFERRED EMBODIMENTS

Figure 1:
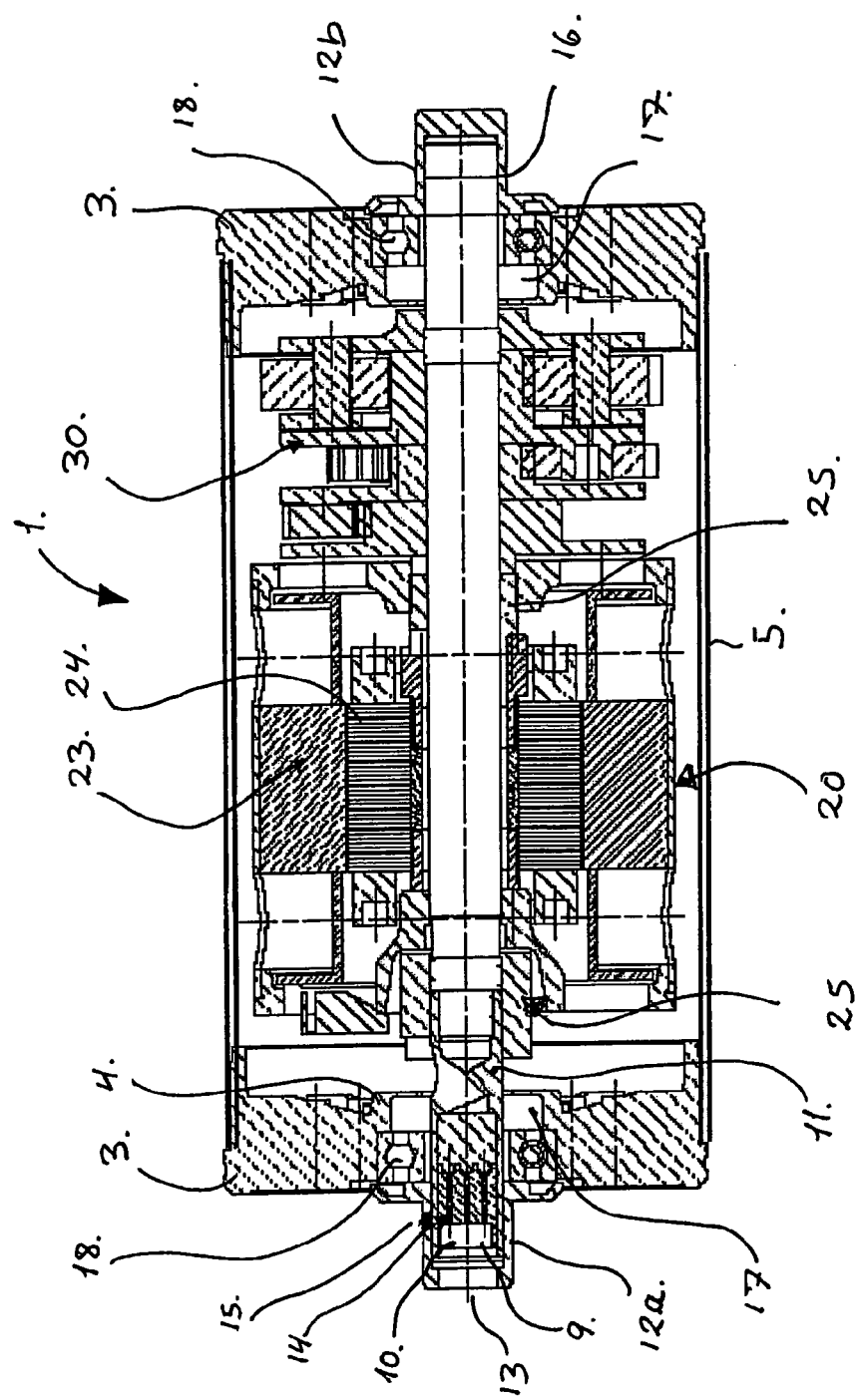
FIG. 1 is a sectional view of a motorized pulley according to the invention.

Thus, FIG. 1 shows a motorized pulley 1 (an electrically operated roller) with a cable connector 10 according to the invention. Such motorized pulley 1 lends itself for use in connection with ie material handling systems, including roller conveyors and endless conveyor belts, packaging systems, logistics systems for goods and luggage, and check-out counters.

The motorized pulley 1 comprises a cylindrical drum 5 (jacket) or an essentially cylindrical drum 5 that is mounted rotatably on a stationary shaft 11 at end caps 3 that are secured at the end of the drum 5. Each end cap 3 comprises a centrally configured hub 4, in which a roller or ball bearing 18 is configured and through which the stationary shaft 11 is conveyed. The hub 4 moreover comprises a sealing (compression packing) 17 for establishing a sealing connection between the hub 4 and the shaft 11, whereby a liquid-proof sealing is provided between the interior of the motorized pulley 1 and the surroundings. At each end of the shaft 11, a shaft pin 12a, 12b is provided exteriorly of the part of the shaft 11 that protrudes beyond the motorized pulley 1, and thus covers the shaft 11. The shaft pins 12a, 12b serve to secure the motorized pulley 1 to the support (eg the frame of a conveyor belt; not shown), whereby reaction forces (the torque) can be transmitted thereto. Each shaft pin 12a, 12b is secured to the shaft 11 by means of a screw 15 or pin 16 that is conveyed through the shaft pin 12a, 12b and down into the shaft 11. The one shaft pin 12a has an opening 13 at the end, and is intended for being secured on the shaft end in which the cable connector 10 is configured in the recess 9.

The motorized pulley 1 comprises an electric motor 20 and a gear 30. The electric motor 20 is secured on the stationary shaft 11 by means of a pin 25. The electric motor 20 comprises a stator 23 and a rotor 24 and is coupled electrically between the stator 23 and the coupling connector 10 configured in the recess 9 of the stationary shaft 11. The rotor 24 is connected to an output shaft 25 that rotates about the stationary shaft 11 and drives the gear 30. The gear 30 serves to reduce the number of revolutions on the output shaft 25 of the electric motor 20 to a desired number of revolutions on the motorized pulley 1. The gear 30 is connected to the drum 5 in a point 26 that provides the transmission of the torque from the gear 30 to the drum 5.

Figure 2:
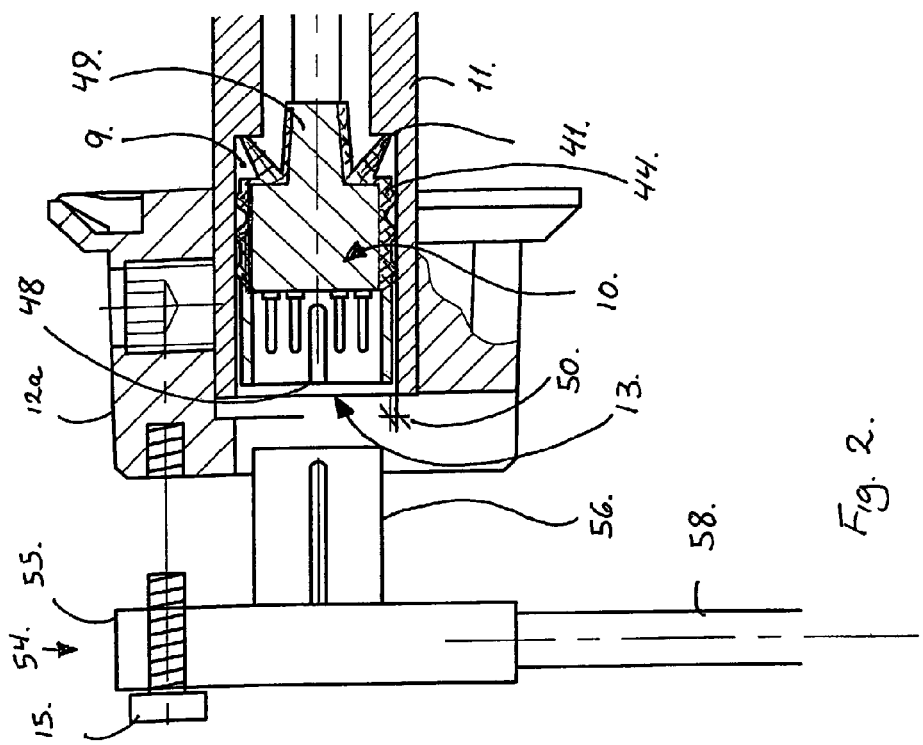
FIG. 2 is a sectional view of a motorized pulley according to the invention.
Figure 3:
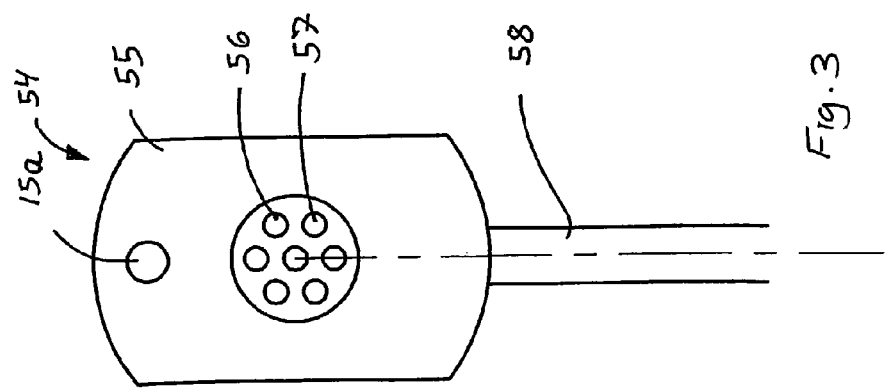
FIG. 3 shows a female connector, seen from the front.

In the following reference is made to FIGS. 2 and 3, FIG. 2 showing a section of a motorized pulley at the shaft end, where the cable connector 10 is mounted. At the end of the fixed shaft 11, a recess 9 is formed that has a circular cross section. In the recess 9 the cable connector 10 is introduced with the coupling end 48 in a direction towards the free shaft end and the cable end 49 in a direction towards the bottom of the recess 9. Reference numeral 50 indicates a tolerance between the cable connector 10 and the surface of the recess, meaning that inaccuracies in the mounting and tolerances in the individual parts are evened out when the motorized pulley is coupled electrically.

If a motorized pulley is to be exchanged, the fastening screw 15 that secures the female connector on the cable connector 10 is removed and the female connector is pulled backwards, whereby the conductors are pulled out of engagement with each other. Then the motorized pulley 1 is exchanged and the female connector is again taken through the opening in the shaft cap and a conductive coupling is established between the conductors in the female connector and the cable connector 1. Finally, the fastening screw 15 is mounted for securing the female connector following initial adaptation/evening out of the tolerances between the individual parts. This is enabled in that the continuously annular bead extending radially from the cylindrical face of the cable connector will, in this context, provide a "point of rotation" for the cable connector (at the cable end). Thereby the cable connector is able to perform a certain angular rotation about this "point of rotation", whereby the coupling end of the cable connector is able to perform a certain movement within the recess in the space between the inner wall of the recess and cable connector. The annular bead being manufactured from an elastic material, the cable connector may furthermore be displaced laterally within the recess. The securing screw 15 may, in particular cases, further establish grounding connection in relation to the motorized pulley 1 and in that respect it constitutes a part of the electrical safety of the motorized pulley.

FIG. 3 shows a plane view of an embodiment of the female connector 54 that may, in some cases, advantageously be used in connection with the cable connector 10. The female connector 54 comprises a body part 55 having an area expanse corresponding essentially to an end of the shaft pin 12a. On the body part 55 a circular contact part 56 extends that is configured with conductors 57 and is intended for engagement with corresponding conductors on the cable connector 10. The body part 55 moreover comprises a circular opening 15a intended for introduction of the fastening screw 15 and a cable 58 for coupling of the electrical current.

Figure 4:
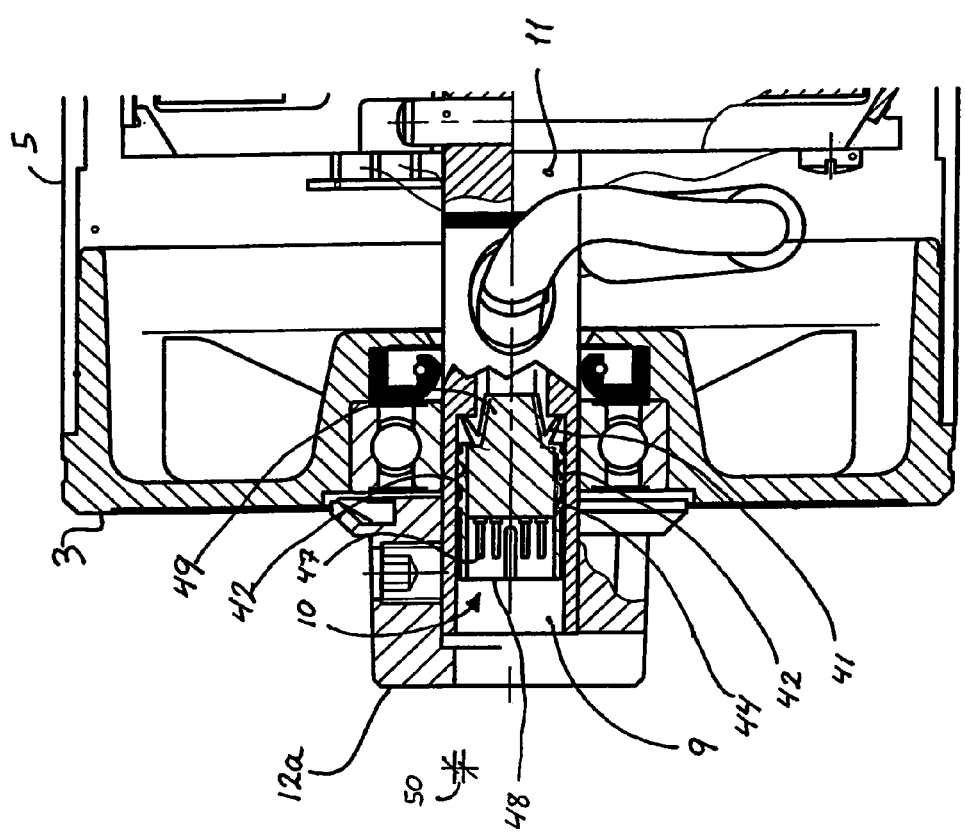
FIG. 4 is a sectional view of a second preferred embodiment of a motorized pulley according to the invention.

In the following reference is made to FIGS. 4 and 5, wherein FIG. 4 is a sectional view of a motorized pulley at the shaft end in which the cable connector 10 is mounted. At the end of the stationary shaft 11, a recess 9 is formed that has a circular cross section. In the recess 9 the cable connector 10 is introduced with the coupling end 48 in a direction towards the free shaft end and the cable end 49 in a direction towards the bottom 9 of the recess. Reference numeral 50 indicates a tolerance between the cable connector 10 and the surface of the recess, meaning that inaccuracies in the mounting and tolerances in the individual parts are evened out when the motorized pulley is coupled electrically.

The cable connector 10 comprises a jacket 44 of a resilient elastic material, which jacket 44 encloses the cable connector 10 at the cable end 49 and extends towards the coupling end 48. The jacket 44 is of a plastics material, eg plastics, neoprene, etc. The cable connector 10 comprises three continuous annular beads 42 that extend radially from the cylindrical face of the cable connector 10. Seen in a direction from the cable end 49 towards the coupling end 48, the cable connector 10 also comprises an annular indentation 43 in the surface between the first and the second continuous annular bead 42. The indentation 43 increases the adaptation between the cable connector 10 and the recess 9. The continuous annular beads 42 and the indentation 43 are preferably cast integrally with the jacket 44, but the continuous annular beads 42 can also, according to the invention, be separate o-rings (not shown) that are mounted on the cable connector 10. Moreover the cable connector 10 comprises a lip sealing 41 that extends from the cable connector 10 at the cable end 49 in a direction away from the cable end 49. The lip sealing 41 abuts on a shoulder 8 at the bottom of the recess 9 and thereby it establishes a sealing connection between the interior of the motorized pulley 1 and the ambient atmosphere.

In the drawing, the female connector is indicated by reference numeral 60. In particular cases the female connector can advantageously be a circular connector with a largest diameter that fits tightly into the recess 9. The female connector is configured with conductors (not shown) that are intended for engaging with corresponding conductors on the cable connector 10.

If a motorized pulley is to be exchanged, the female connector can readily be pulled rearwards, whereby the conductors are pulled out of their mutual engagement. Then the motorized pulley 1 and the female connector are again taken through the opening in the shaft cap and a conductive coupling is established between the conveyors in the female connector and the cable connector 1. This is enabled in that, in this context, the continuously annular bead extending radially from the cylindrical surface of the cable connector provides a "point of rotation" for the cable connector (at the cable end). Thereby the cable connector is able to perform a certain angular rotation about this "point of rotation", whereby the coupling end of the cable connector is able to perform a certain movement within the recess in the space between the inner wall of the recess and cable connector. The continuous annular bead being manufactured form an elastic material enables the cable connector to also be displaced sideways in the recess. In particular cases it is also advantageous that the continuous annular beads 42 have a diameter larger than the cylindrical recess 9 configured at an end of the shaft 11. Thereby the continuous annular beads 42 are compressed upon insertion of the cable connector in the recess 9 and establish a certain friction between the surface of the recess and the continuous annular beads 42. Hereby increased safety is provided against the cable connector 10 being shifted when the female connector is coupled thereto.

In the above the cable connector is described as a male connector; however, it will be understood that the cable connector may be in the form of a female connector.

The invention claimed is:

1. A motorized pulley with a cable connector (10) comprising a cylindrical drum (5) that is rotatably mounted about a shaft (11) configured for being fixedly mounted on support means, said cylindrical drum (5) delimiting an interior space intended for receiving an electric motor (20) for producing a rotating movement of the drum about the shaft (11), wherein said shaft comprises a cylindrical recess (9) configured at an end of the shaft (11) for receiving the cylindrical cable connector (10) that is electrically coupled to said electric motor (20) and wherein the cable connector (10) comprises a coupling end (48) and a cable end (49), characterised in that said cable connector (10) comprises at that cable end (49) a jacket of a resiliently elastic material and at least one annular, elastic bead (42) that extends continuously radially from the cylindrical surface of the cable connector (10) and abuts on an inner face of the recess (9), and in that said continuously annular bead (42) is configured in the resiliently elastic jacket (44), preferably cast integrally in the resiliently elastic jacket (44).

2. A motorized pulley according to claim 1, characterised in that the cable connector is cylindrical and said jacket (44) encloses the cable connector (10) at the cable end (49) and extends towards the coupling end (48).

3. A motorized pulley (1) according to claim 2, characterised in that the jacket (44) comprises an annular lip sealing (41) that extends from the cable end (49) in a direction away from the cable end (49).

4. A motorized pulley (1) according to claim 3, characterised in that the continuous annular beads (42) have a diameter larger than the cylindrical recess (9) configured at an end of the shaft (11), whereby the continuous annular beads (42) are compressed upon insertion of the cable connector into the recess (9) at the end of the shaft (11).

5. A motorized pulley (1) according to claim 4, characterised in that the cable connector (10) is a male connector.

6. A motorized pulley (1) according to claim 5, characterised in that the cable connector (10) is situated entirely within the recess (9) at the end of the shaft (11).

7. A motorized pulley (1) according to claim 1, characterised in that the jacket (44) comprises an annular lip sealing (41) that extends from the cable end (49) in a direction away from the cable end (49).

8. A motorized pulley (1) according to claim 7, characterised in that the continuous annular beads (42) have a diameter larger than the cylindrical recess (9) configured at an end of the shaft (11), whereby the continuous annular beads (42) are compressed upon insertion of the cable connector into the recess (9) at the end of the shaft (11).

9. A motorized pulley (1) according to claim 8, characterised in that the cable connector (10) is a male connector.

10. A motorized pulley (1) according to claim 9, characterised in that the cable connector (10) is situated entirely within the recess (9) at the end of the shaft (11).

11. A motorized pulley (1) according to claim 1, characterised in that the continuous annular beads (42) have a diameter larger than the cylindrical recess (9) configured at an end of the shaft (11), whereby the continuous annular beads (42) are compressed upon insertion of the cable connector into the recess (9) at the end of the shaft (11).

12. A motorized pulley (1) according to claim 11, characterised in that the cable connector (10) is a male connector.

13. A motorized pulley (1) according claim 12, characterised in that the cable connector (10) is situated entirely within the recess (9) at the end of the shaft (11).

14. A motorized pulley (1) according to claim 1, characterised in that the cable connector (10) is a male connector.

15. A motorized pulley (1) according claim 14, characterised in that the cable connector (10) is situated entirely within the recess (9) at the end of the shaft (11).

16. A motorized pulley (1) according to claim 1, characterised in that the cable connector (10) is situated entirely within the recess (9) at the end of the shaft (11).

* * * * *